United States Patent [19]

Junius et al.

[11] Patent Number: 5,573,663
[45] Date of Patent: Nov. 12, 1996

[54] FLUID FILTER USING FLOATING MEDIA

[76] Inventors: John H. Junius; Anna H. Junius, both of 79465 Highway 1083, Bush, La. 70431

[21] Appl. No.: 179,452

[22] Filed: Jan. 10, 1994

[51] Int. Cl.$^6$ ............................................ B01D 24/46
[52] U.S. Cl. .................................... 210/189; 210/269
[58] Field of Search ........................... 210/169, 189, 210/269, 792, 265

[56] References Cited

U.S. PATENT DOCUMENTS

| | | | |
|---|---|---|---|
| 887,069 | 5/1908 | Cotter . | |
| 2,464,707 | 3/1949 | Montgomery et al. | 210/7 |
| 2,631,727 | 3/1953 | Cichelli | 210/42.5 |
| 2,866,827 | 12/1958 | Jurgeleit et al. | 260/637 |
| 3,003,641 | 10/1961 | Laughlin | 210/189 |
| 3,193,498 | 7/1965 | Platzer et al. | 210/33 |
| 3,215,624 | 11/1965 | Frazer et al. | 210/33 |
| 3,882,022 | 5/1975 | Lagoutte | 210/189 |
| 3,892,663 | 7/1975 | Wiedenmann | 210/169 |
| 4,009,099 | 2/1977 | Jeris | 210/151 |
| 4,009,105 | 2/1977 | Jeris | 210/151 |
| 4,036,854 | 7/1977 | Chang | 260/343.2 R |
| 4,052,300 | 10/1977 | Mosso | 210/20 |
| 4,197,201 | 4/1980 | Hjelmner et al. | 210/269 |
| 4,198,301 | 4/1980 | Iwatani | 210/274 |
| 4,234,420 | 11/1980 | Turbeville | 210/671 |
| 4,415,454 | 11/1983 | Fuchs | 210/616 |
| 4,416,860 | 11/1983 | Heitkamp et al. | 423/6 |
| 4,547,286 | 10/1985 | Hsiung | 210/738 |
| 4,566,971 | 1/1986 | Reimann et al. | 210/616 |
| 4,576,718 | 3/1986 | Reischl et al. | 210/616 |
| 4,582,600 | 4/1986 | Atkinson et al. | 210/151 |
| 4,608,181 | 8/1986 | Hsiung et al. | 210/786 |
| 4,743,382 | 5/1988 | Williamson et al. | 210/269 |
| 4,842,744 | 6/1989 | Schade | 210/636 |
| 4,898,672 | 2/1990 | Clifft et al. | 210/614 |
| 4,919,815 | 4/1990 | Copa et al. | 210/603 |
| 5,126,042 | 6/1992 | Malone | 210/150 |
| 5,126,056 | 6/1992 | Carlson | 210/676 |
| 5,387,335 | 2/1995 | Iwai et al. | 210/151 |

FOREIGN PATENT DOCUMENTS

| | | |
|---|---|---|
| 120867 | 11/1918 | United Kingdom . |
| 903800 | 8/1962 | United Kingdom . |

OTHER PUBLICATIONS

Denver Equipment Company, 1985, Agitators/Mixers Brochure.
Armant Aquaculture, Armant Aquaculture's Propellor--Washed Bead Filters.

*Primary Examiner*—Ivars Cintins
*Attorney, Agent, or Firm*—Pravel, Hewitt, Kimball & Krieger

[57] ABSTRACT

A filter system (110) includes a tank (130) with a conveyer (140) for, preferably continuously, conveying filter media (11) from a filter zone (119) in the tank (130) where the filter media (11) traps predetermined matter (16), such as particulates, to a quiet zone (115) in the tank (130) where the predetermined matter (16) separates from the filter media (11) and is allowed to accumulate and be withdrawn from the tank (130). The conveyer (140) preferably includes a screw auger (141) and a duct (142) for containing the screw auger (141). The filter media (11) is preferably buoyant when the fluid (21) being filtered is water.

13 Claims, 6 Drawing Sheets

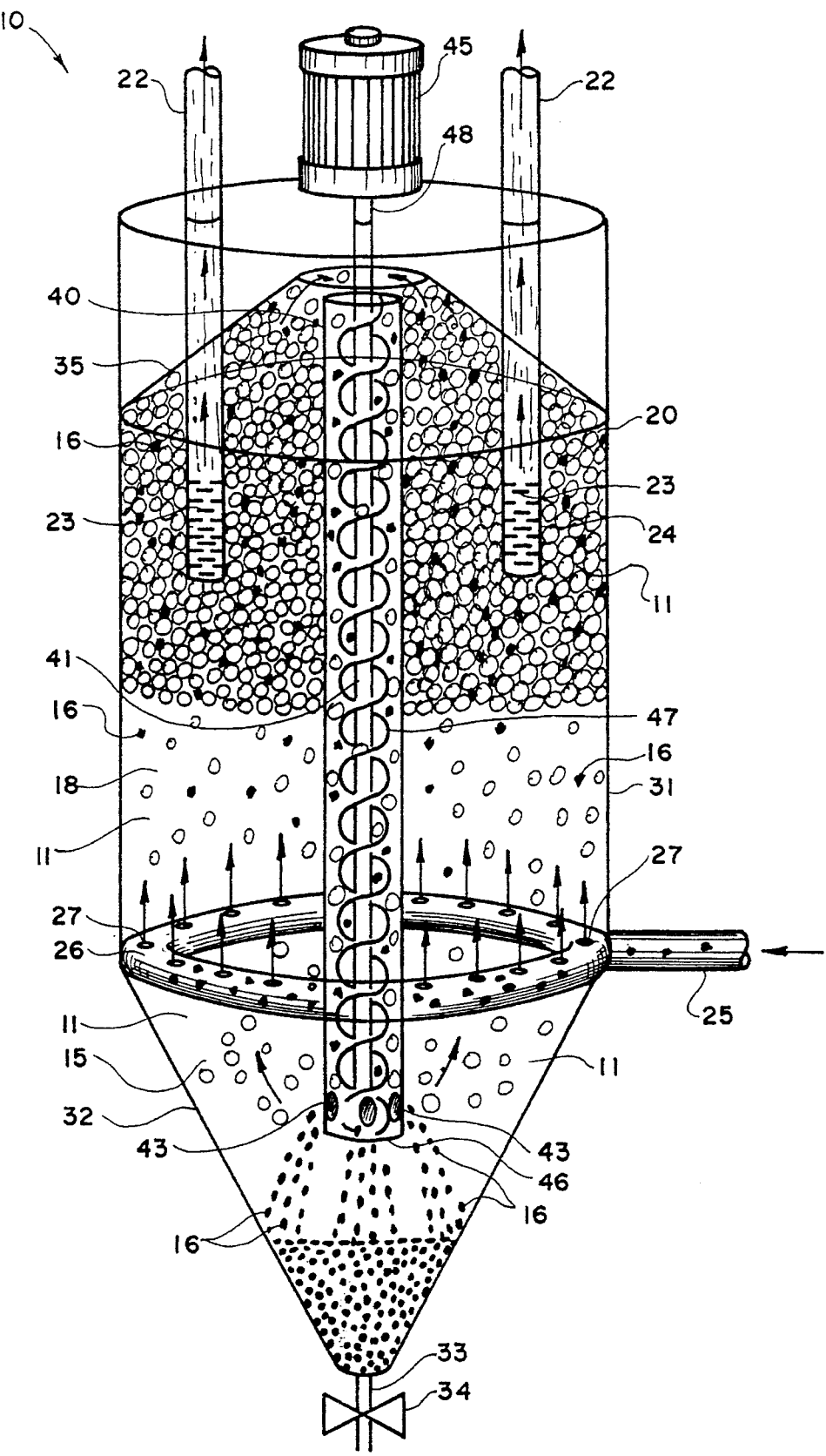
F I G. 1

5,573,663

FLUID FILTER USING FLOATING MEDIA

BACKGROUND OF THE INVENTION

1. Field of the Invention

The present invention relates to filters for fluids. More particularly, the present invention relates to a filter system for fluids which utilizes filter media having a density different from the fluid (such as buoyant plastic beads when water is being filtered).

2. General Background of the Invention

In the filtration of fluids, filter media in the form of plastic beads or other particulates, such as diatomaceous earth or sand, is used to trap impurities. Typically, the filter media must be backwashed at predetermined intervals to keep the filter operating smoothly. This backwashing requires that the filter system be shut down, which can be quite inconvenient if continuous filtration is required during processing. If that is the case, then the process must be shut down while the filter is being backwashed, resulting in undesirable loss of production.

U.S. Pat. No. 5,126,042 discloses such a filter. In addition to the problem of needing to shut the system down to backwash the filter, static filters such as the one disclosed in the '042 patent can suffer from tunneling problems. Tunneling occurs when the filter media get clogged or bacterial gel builds up on the media, causing the filter media to stick together. Water breaks tunnels through the filter media and, following the path of least resistance, continues to travel through the tunnels instead of getting filtered by the filter media.

SUMMARY OF THE INVENTION

The apparatus of the present invention is a filter system in which backwashing is not necessary, as the filter media is constantly rejuvenated. The apparatus of the present invention comprises a tank means for containing a volume of fluid, an influent means for introducing the fluid into the tank means, an effluent means for allowing filtered fluid to exit the tank means, and filter media for filtering predetermined matter (such as particulates, which may be impurities) out of the fluid. In the tank means there is a filter zone where the filter media is relatively tightly packed, a mixing zone where the filter media is relatively loosely packed, and a quiet zone adjacent the mixing zone, the mixing zone being between the filter zone and the quiet zone. An important feature of the present invention is a conveyer means for conveying filter media from the filter zone to the quiet zone.

Preferably, the filter zone is adjacent the effluent means, the mixing zone is between the influent means and the filter zone, and the quiet zone is below the mixing zone.

When the fluid being filtered is water, the filter media preferably comprises buoyant beads and the conveyer means can comprise a screw auger. When the fluid is water, the predetermined matter usually comprises solid impurities. There is a motor means for turning the screw auger and a duct means for containing the screw auger. The influent means preferably includes pipes which secure the duct means to the wall of the tank means. There is a waste outlet for extracting predetermined matter from the quiet zone.

The conveyer means can be water-powered, as described in the detailed description of the invention, so that the number of moving parts of the invention is reduced. However, the water-powered version ties together the flow rate of water through the filter to the flow rate of beads through the conveyer means.

The effluent means can comprise a plurality of effluent pipes and means for stopping fluid flow out of the tank means through at least one effluent pipe while fluid flows out of the tank means through at least one other effluent pipe.

The filter apparatus can be a part of a system comprising, in addition to the apparatus mentioned above, a fish tank containing live fish and water, the water in the fish tank being the fluid being filtered in the tank means, and the filter media being buoyant in the water. There is preferably also a pump for pumping water from the fish tank to the tank means. In such a case, most of the predetermined matter being filtered would be particulates denser than water.

The method of filtering fluid of the present invention comprises the steps of providing a tank means for containing a volume of fluid, introducing the fluid into the tank means, providing a filter media for filtering predetermined matter out of the fluid, causing the filter media to pack relatively tightly in a filter zone in the tank means, flowing the fluid through the filter zone where predetermined matter in the fluid become trapped in the filter media, flowing the filtered fluid out of the tank means, conveying the filter media and trapped predetermined matter from the filter zone to a quiet zone where the predetermined matter moves away from the filter zone and the filter media move in the direction of the filter zone, and allowing the filter media to move from the quiet zone to a mixing zone where the filter media mixes with predetermined matter in the fluid being filtered.

Preferably, the filter media and trapped predetermined matter are continuously conveyed from the filter zone to the quiet zone. Usually, when the fluid being filtered is water, the trapped predetermined matter comprises particulates which drop to the bottom of the tank means in the quiet zone.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 1 is an elevational sectional view of a first embodiment of the apparatus of the present invention.

PARTS LIST

Figure 2:
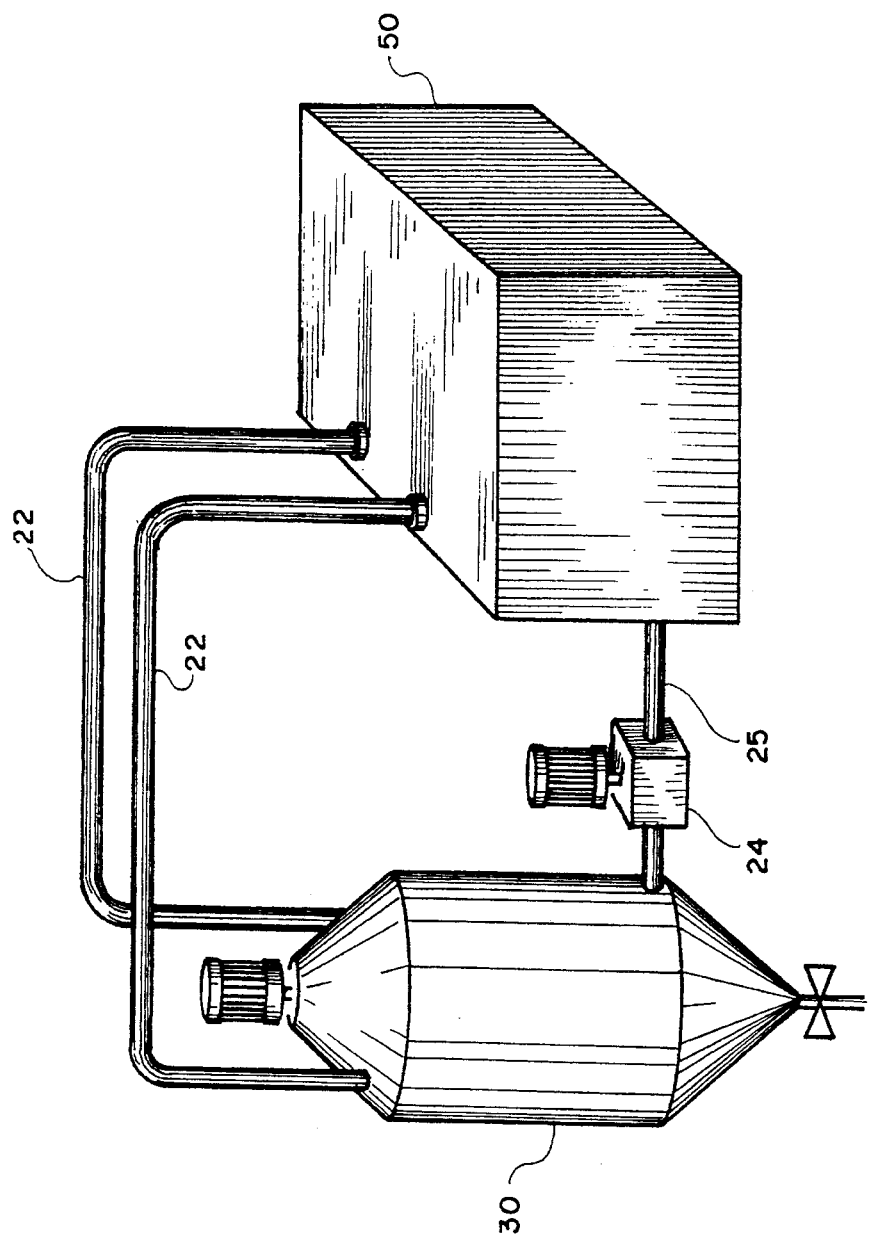
FIG. 2 shows a fish tank system in which the filter apparatus of the present invention is being used.

The following is a list of suitable parts and materials for the various elements of the preferred embodiment of the present invention.

10 filter apparatus of a first embodiment of the present invention 11 buoyant filter media (preferably polypropylene or polyethylene)

15 quiet zone in tank 30

16 particulates to be filtered out of fluid 21

18 mixing zone where particulates 16 and the filter media 11 mix 19 filter zone where particulates 16 become trapped in the filter media 11

21 fluid (e.g., water) to be filtered 22 effluent pipes (could be screen pipe with a closed bottom)

23 filter area of effluent pipes 24 pump 25 influent pipe 26 influent ring 27 exit holes in influent ring 26

30 tank 31 cylindrical wall of tank 30 (stainless steel or fiberglass, e.g.)

32 conical bottom of tank 30

33 waste outlet of tank 30

34 valve for waste outlet 33

35 conical top of tank 30 (filter media control cap)

40 conveyer means 41 auger, preferably 6" or 9" diameter Helicoid Conveyer Screw 42 counter-direction friction duct containing auger 41 (suitable means, not shown, secure it within tank 30)

43 exit holes in the bottom of duct 42

44 entrance of duct 42

45 motor for turning auger 41 (preferably variable-speed)

46 closed bottom of duct 42

47 flighting of auger 41

48 shaft of auger 41

50 fish tank 110 filter apparatus of the second embodiment of the present invention 115 quiet zone in tank 130

118 mixing zone where particulates 16 and the filter media 11 mix 119 filter zone where particulates 16 become trapped in the filter media 11

122 outer effluent pipes 123 filter area of inner pipes 124

124 inner strainer slide pipe 125 influent pipes (schedule 40 PVC or stainless steel)

127 exit holes in influent pipes 125

128 nozzles in exit holes 127 in influent pipes 125

130 tank 131 cylindrical wall of tank 130 (stainless steel or fiberglass, e.g.)

132 conical bottom of tank 130

133 waste outlet of tank 130

134 valve for waste outlet 133

135 dome-shaped top of tank 130 (filter media control cap)

137 nylon bearing plate 138 stuffing box plate 139 threaded fittings for securing pipes 125 to tank 130

140 conveyer means 141 auger, preferably 6", 9", or 12" diameter ½ pitch Interlox Conveyer Screw 142 counter-direction friction duct containing auger 141

143 exit vents in the bottom of duct 142

144 entrance vents in duct 142

146 closed bottom of duct 142 (closed with bearing plate 137)

147 flighting of auger 141

148 shaft of auger 141

149 threaded fittings for securing pipes 125 to duct 142

151 ball float valve 152 ball retainer cage 153 ball of ball float valve 151

160 blades in quiet zone 130

210 filter apparatus of the third embodiment of the present invention 230 tank (stainless steel or fiberglass, e.g.)

231 end wall of tank 230

232 V-shaped bottom of tank 230

233 curved top of tank 230

234 side wall of tank 230

235 compartment of tank 230

310 filter apparatus of the fourth embodiment of the present invention 330 tank 335 compartment of tank 330

350 partition in tank 330

410 filter apparatus of the preferred embodiment of the present invention 415 quiet zone of tank 430

418 mixing zone of tank 430

419 filter zone of tank 430

422 effluent pipes 425 influent pipes 426 influent direction-altering pipes 427 funnel 428 exit troughs 429 exit screens 430 tank of apparatus 410 (stainless steel or fiberglass, e.g.)

431 cylindrical wall of tank 430

432 flat bottom of tank 430

435 open top of tank 430

440 conveyer means 442 counter-direction friction duct 443 exit vents in the bottom of duct 442

445 deflector cone

DETAILED DESCRIPTION OF THE PREFERRED EMBODIMENT

FIG. 1 shows a first embodiment of the present invention, filter apparatus 10.

Filter apparatus 10 includes a tank 30 having a cylindrical wall 31, a conical bottom 32, and a conical top 35 (which can be considered a filter media control cap, as will be described further). Tank 30 has a waste outlet 33 at the bottom thereof. There is a valve 34 for controlling flow out of waste outlet 33.

In tank 30 there is a fluid 21 (e.g., water) to be filtered and a buoyant filter media 11 (preferably polypropylene or polyethylene) with which to filter the fluid.

Tank 30 includes a mixing zone 18 where particulates 16 and the filter media 11 mix, a filter zone 19 where particulates 16 become trapped in the filter media 11, and a quiet zone 15 where particulates 16 to be filtered out of fluid 21 can settle.

Fluid enters through exit holes 27 in an influent ring 26, which is supplied fluid from influent pipe 25. Fluid exits tank 30 through effluent pipes 22. Effluent pipes have a filter area 23 for preventing filter media 11 from exiting therethrough with fluid 21.

There is a conveyer means 40 for moving filter media 11 in a direction counter to the direction of flow of fluid 21 through tank 30, from the top of the filter zone 19 to quiet zone 15. Conveyer means 40 could comprise, for example, a plunger pump or a propeller pump, but in the first embodiment of the present invention it comprises an auger 41. Conveyer means 40 includes auger 41 and a counter-direction friction duct 42 containing auger 41 (suitable means, not shown, secure duct 42 within tank 30). There is a motor 45 (preferably variable-speed) for turning auger 41.

Duct 42 includes an entrance 44, a closed bottom 46, and exit holes 43 adjacent the bottom 46 of duct 42. Exit holes 43 are preferably as open as possible to prevent clogging.

Auger 41 includes a shaft 48 and flighting 47 attached to shaft 48.

A pump 24 pumps water from fish tank 50 to tank 30.

In operation, a sufficient quantity (such as 80–100 cubic feet when tank 30 has a volume of 120–150 cubic feet) of buoyant filter media 11 (preferably polypropylene or polyethylene beads having an average diameter of approximately 3/32–1/8 inch) is placed in filter apparatus 10 of the first embodiment of the present invention. Fluid 21 (e.g., water) to be filtered enters tank 30 via influent pipe 25, influent ring 26, and exit holes 27 in influent ring 26. Fluid 21 moves into mixing zone 18 where particulates 16 and the filter media 11 mix. Fluid 21 then moves into filter zone 19 where particulates 16 in fluid 21 become trapped in the filter media 11. After passing through filter zone 19, fluid 21 passes through the filter area 23 of effluent pipes 23 and passes out of tank 30.

While fluid 21 is passing from the influent pipe 25 through tank 30 and out of effluent pipes 23, the filter media 11 is being moved in the opposite direction by conveyer means 40. Conveyer means 40 includes an auger 41 (preferably 6" or 9" diameter Helicoid Conveyer Screw), a counter-direction friction duct 42 containing auger 41 (suitable means, not shown, secure it within tank 30), and a motor 45 (preferably variable-speed) for turning auger 41. Duct 42 includes an entrance 44 and exit holes 43 in the closed bottom 46 thereof. Auger 41 includes flighting 47 attached to a shaft 48. Conveyer means 40 pulls filter media 11 downward (upstream) from the top (downstream side) of filter zone 19 to quiet zone 15 of tank 30, where the filter media 11 and particulates 16 separate, with particulates 16 settling to the bottom of tank 30 in the quiet zone 15, and filter media 11 floats upward into the mixing zone 18. When a sufficient quantity of particulates 16 has accumulated in the conical bottom 32 of tank 30, valve 34 of waste outlet 33 is opened to allow them to exit tank 30.

Conical top 35 of tank 30 (filter media control cap) contains the filter media 11.

Pump 24 pumps water from fish tank 50 to tank 30.

Figure 3:
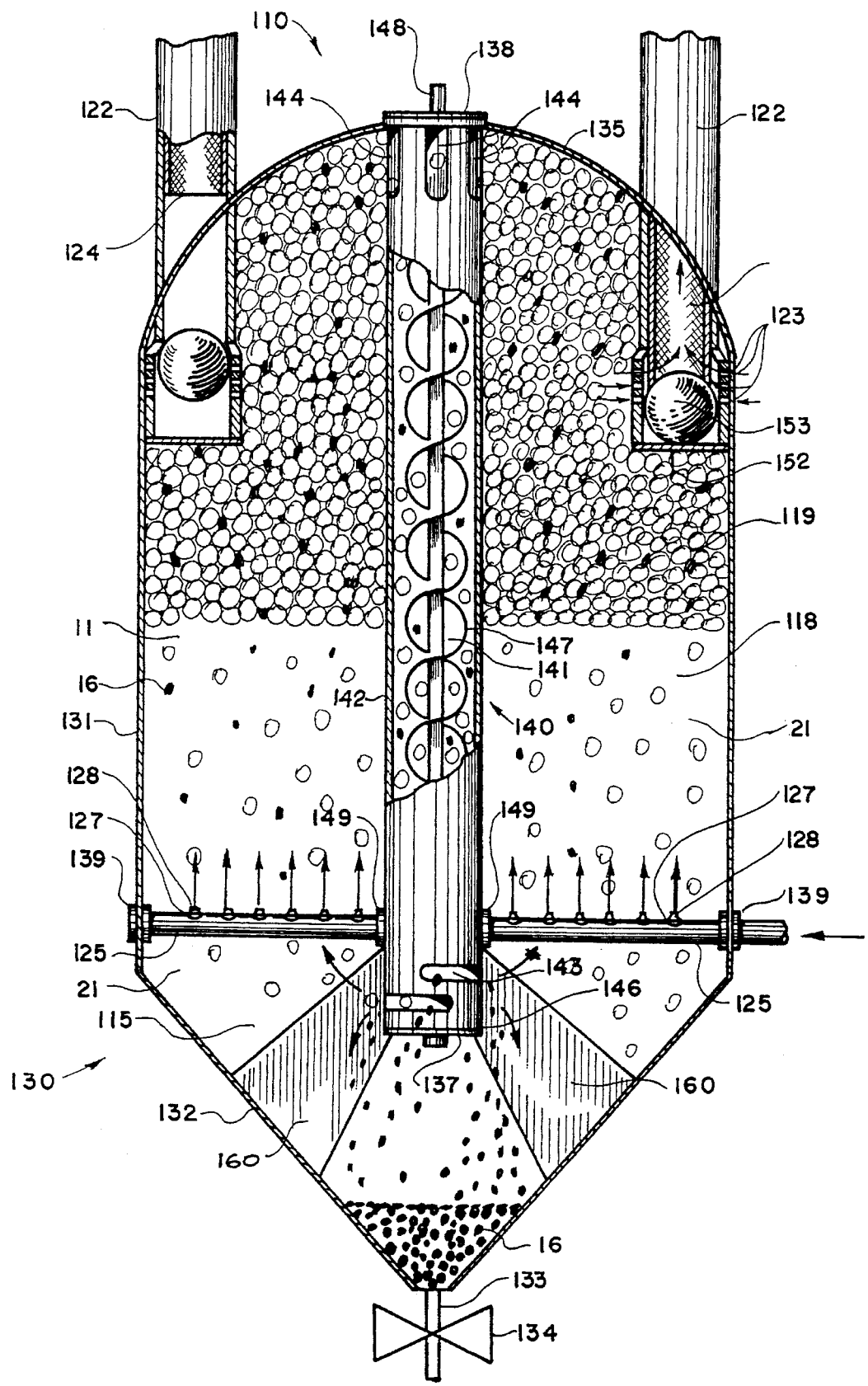
FIG. 3 is an elevational sectional view of a second embodiment of the apparatus of the present invention.
Figure 4:
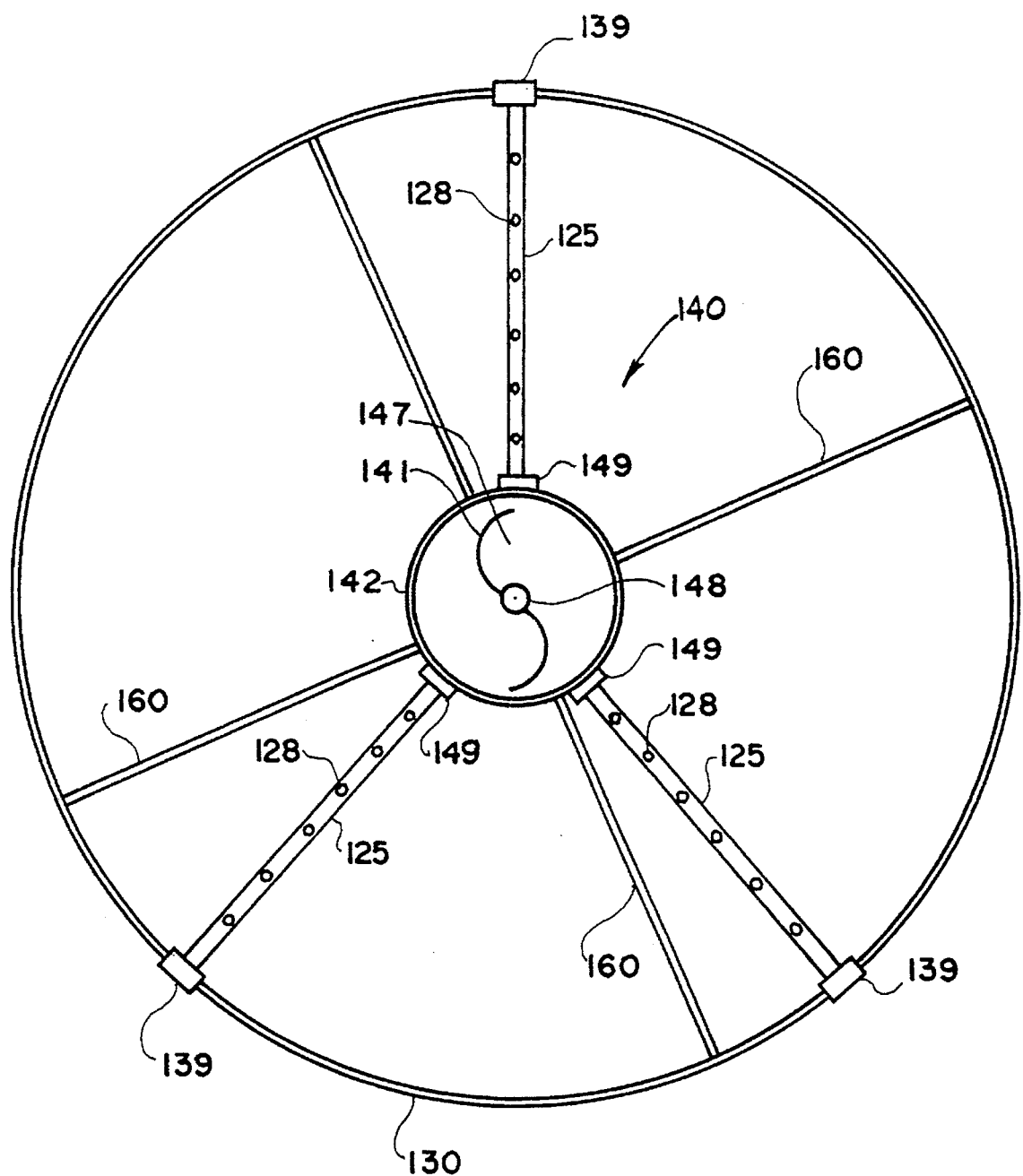
FIG. 4 is a sectional view of the second embodiment of the apparatus of the present invention.

Filter apparatus 110, the filter apparatus of the second embodiment of the present invention, is shown in FIGS. 3 and 4. Filter apparatus 110 includes a tank 130 having a cylindrical wall 131, a conical bottom 132, and a dome-shaped top 135. There is a quiet zone 115 in tank 130, a mixing zone 118 where particulates 16 and the filter media 11 mix, and a filter zone 119 where particulates 16 become trapped in the filter media 11. Adjacent conical bottom 132 of tank 130 is a waste outlet 133 having a valve 134. There are four blades 160 in quiet zone 130 to help make zone 130 even quieter (i.e., less turbulent).

There is a conveyer means 140 for conveying filter media 11 from the top of tank 130 to quiet zone 115. Conveyer means 140 comprises an auger 141, a counter-direction friction duct 142 containing auger 141, and a motor for turning auger 41 (preferably variable-speed—not shown, but it can be the same as motor 45). Duct 142 includes entrance vents 144 adjacent the top thereof, a closed bottom 146, and exit vents 143 in the bottom thereof.

There is a nylon bearing plate 137 adjacent the closed bottom 146 of duct 142 which closes the bottom 146. There is a stuffing box plate 138 adjacent the top of duct 142.

Threaded fittings 149 secure influent pipes 125 to duct 142, while threaded fittings 139 secure pipes 125 to tank 130. Influent pipes 125 may comprise schedule 40 PVC or stainless steel. There are exit holes 127 in influent pipes 125, with nozzles 128 in exit holes 127.

Auger 141 includes a shaft 148 and flighting 147.

There are a plurality of outer effluent pipes 122 (four, for example), with each pipe 122 having disposed therein an inner strainer slide pipe 124. Each pipe 124 includes a filter area 123 which projects downwardly into tank 130 out of outer effluent pipe 122.

Adjacent the bottom of each pipe 124 is a ball float valve 151. Ball float valve 151 includes a ball retainer cage 152 and a ball 153. The openings in cage 152 are large enough to allow filter media 11 to pass therethrough but small enough that ball 153 cannot.

In operation, a predetermined quantity of filter media 11 is placed in tank 130. Fluid 21 enters tank 130 through pipes 125 adjacent quiet zone 115, and is directed upward through nozzles 128 in exit holes 127 in pipes 125. Particulates 16 entrained in fluid 21 mix with filter media 11 as fluid 21 and filter media 11 move toward the top of tank 130. Filtered fluid exits tank 130 through cages 152 and pipes 122. Filter media 11 and particulates 16 that reach the top of tank 130 are drawn into duct 142 through entrance vents 144 by auger 141. Auger 141 conveys filter media 11 and particulates 16 downward through duct 142 and out of duct 142 through exit vents 143 into quiet zone 115. In quiet zone 115 filter media 11 and particulates 16 separate, with particulates 16 settling to the bottom of tank 130 and filter media 11 rising through the mixing zone 118 to filter zone 119.

Ball float valve 151 closes off fluid flow to effluent pipes 122 when it is desired to clean inner effluent pipe 124. When inner effluent pipe 124 is pulled upward in outer effluent pipe 122, buoyant ball 153 rises and seats against the bottom of outer effluent pipe 122, cutting off fluid flow from tank 130 into outer effluent pipe 122. Because there are a plurality of outer effluent pipes 122 and inner effluent pipes 124, it is possible to clean inner effluent pipes 124 without stopping the flow of fluid through tank 130. Inner effluent pipes 124 can be cleaned individually by pulling them upward and allowing buoyant balls 153 to rise and seat against the bottom of outer effluent pipes 122. As long as one inner effluent pipe 124 is in operation, the others can be shut down and cleaned, though it is preferable to have as many inner effluent pipes 124 as possible operating at one time to allow maximum flow rate of fluid through tank 130.

Because of the filter media 11 being constantly rejuvenated by conveyer means 140, and because inner effluent pipes 124 can be cleaned individually without stopping fluid flow through tank 130, tank 130 can be operated continuously, with the need to need for backwashing, as in other filters. This means that the apparatus of the present invention can be used for considerable periods of time (for example, several months) without any down time due to backwashing.

Conical top 35 of tank 30 could be replaced with a cap which only controls the filter media 11, and which does not control fluid flow. A top for tank 30 would be positioned above such a cap. The cap could be, for example, either dome or cone shaped.

A baffle could be provided adjacent the bottom 32 of tank 30 to make quiet zone 15 even quieter.

Impurities to be filtered out with the system of the present invention could be less dense than the fluid being filtered, in which case the filter could be turned upside down and a filter media denser than the fluid could be used (e.g., if floating impurities are to be filtered out of water, the filter would be turned upside down and sand could be used as the filter media).

As can be seen, the top of the tank could be various shapes, including dome shaped or cone shaped.

Tanks 30 and 130 could be partitioned and several augers could be used to move filter media from the top (downstream end) of the tanks to the bottom (upstream end).

The present invention can be used for waste water treatment, solid removal, livestock use (for example, to clean waste water), and particle removal. Bacteria grows on bed particles.

Particles less dense than water float upward, and particles more dense settle.

All piping could be plastic or stainless steel, for example.

Tanks 30 and 130 could be insulated so that they could be used outdoors, for example.

In tank 130, effluent means other than effluent pipes 122, 124, and ball float valve 151 could be used—the primary advantage of the effluent means disclosed herein is that it is possible to clean the individual effluent means without shutting down the filtration process, thus allowing continuous filtration.

Figure 5:
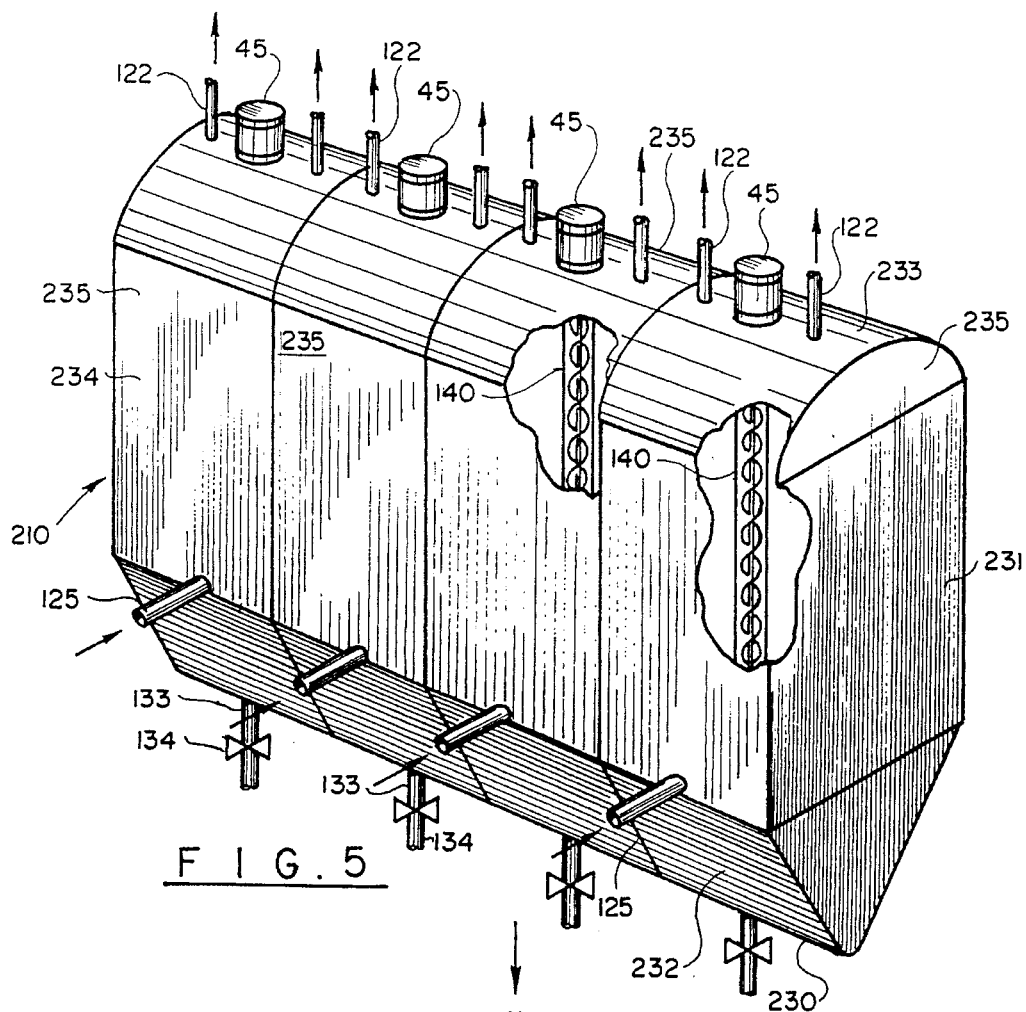
FIG. 5 is an elevational, partially cut-away view of a third embodiment of the apparatus of the present invention.
Figure 6:
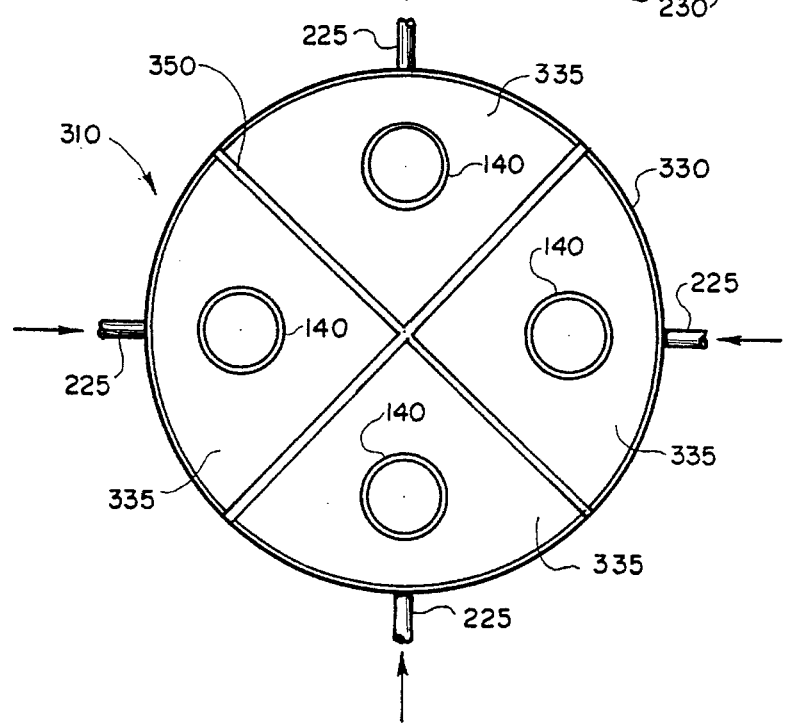
FIG. 6 is a sectional view of a fourth embodiment of the apparatus of the present invention.

The third embodiment of the present invention, filter apparatus 210, is shown in FIG. 5. Filter apparatus 210 includes a tank 230 having two end walls 231, two side walls 234, a curved top 233, and a V-shaped bottom 232. Internal partitions (not shown in FIG. 5) divide tank 230 into four compartments 235. Each compartment 235 includes a conveyer means 140 and filter media 11, and contains the same elements and can work, for example, in the same manner as apparatus 110. The plurality of individual compartments 235 are not in fluid communication with one another unless one connects the effluent of one compartment to the influent of another to make a multi-stage filter apparatus. Otherwise, the filters can filter water from various sources without there being any fluid contact between the sources; this can be useful when one wishes to avoid spreading disease from tank to tank on a fish farm.

The filter apparatus of the fourth embodiment of the present invention, filter apparatus 310, includes a tank 330 divided by a partition 350 into a plurality of compartments 335. Each compartment 335 includes a conveyer means 140 and filter media 11 and contains the same elements and can work, for example, in the same manner as apparatus 110. Tank 330 could be, for example, the same shape as tank 130.

Figure 8:
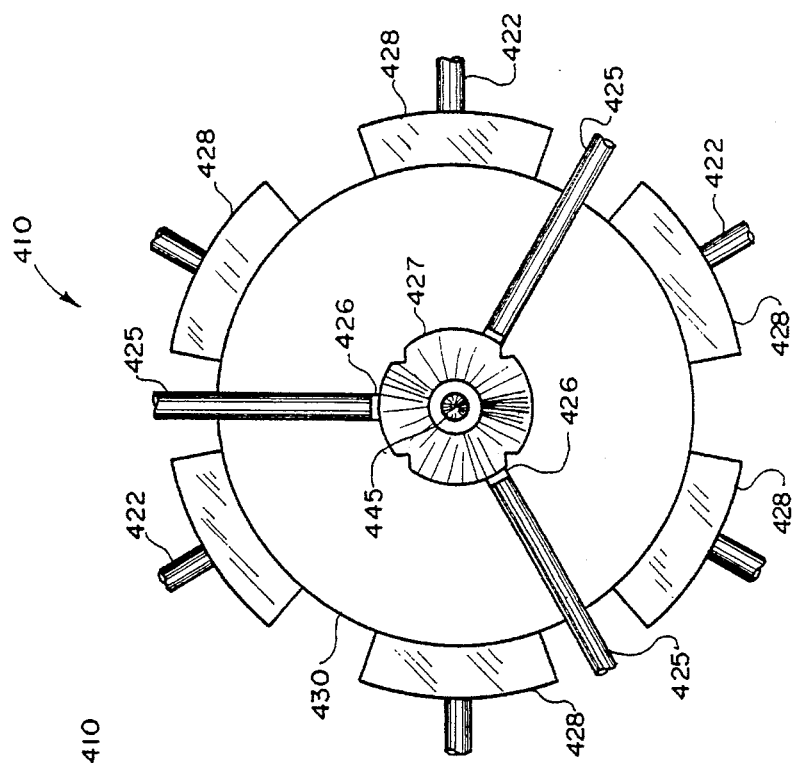
FIG. 8 is a sectional view of the preferred embodiment of the apparatus of the present invention.
Figure 7:
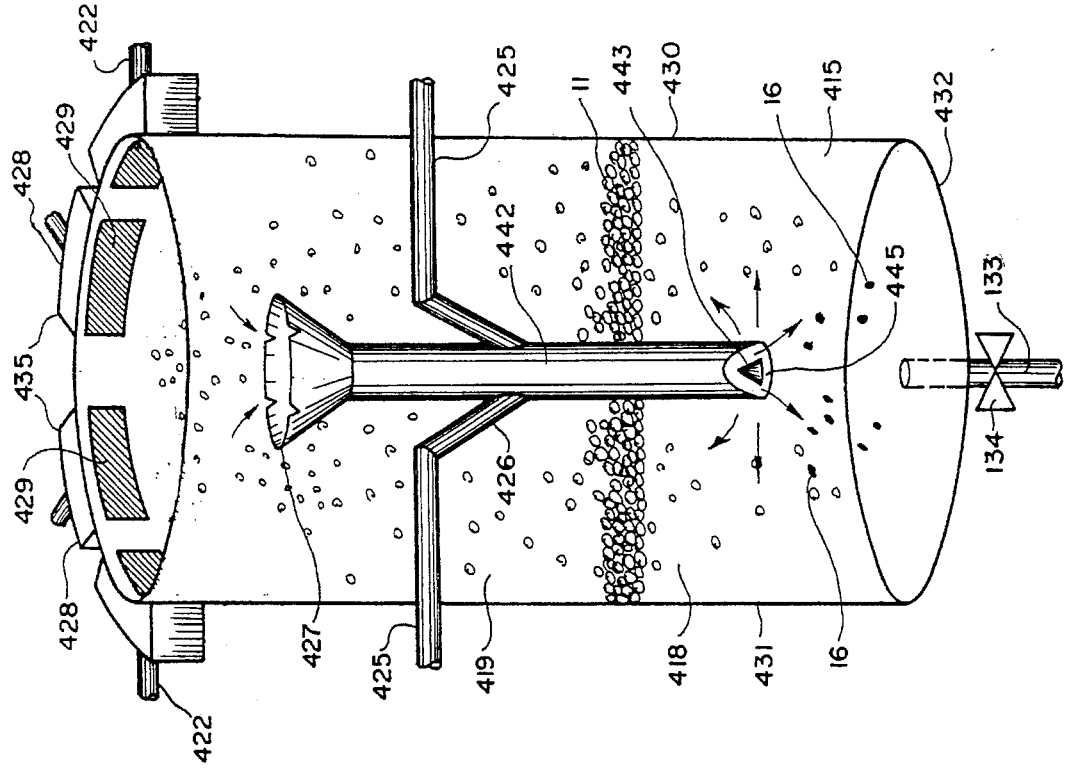
FIG. 7 is an elevational, partially cut-away view of the preferred embodiment of the apparatus of the present invention.

FIGS. 7 and 8 show the filter apparatus 410 of the preferred embodiment of the present invention. Apparatus 410 includes a tank 430 having a cylindrical wall 431, a flat bottom 432, and an open top 435. Apparatus 410 also includes a conveyer means 440 including a counter-direction friction duct 442, funnel 447, influent direction-altering pipes 426, and a deflector cone 445.

Water enters tank 430 via influent pipes 425. The water is then directed downward into counter-direction friction duct 442 via influent direction-altering pipes 426. The water entering duct 442 via pipes 426 causes a suction at funnel 427, drawing water, filter media 11, and particulates 16 into duct 442. The water, filter media 11, and particulates 16 pass through duct 442 and are deflected by deflector cone 445 through exit vents 443 in the bottom of duct 442 into quiet zone 415. In quiet zone 415 filter media 11 and particulates 16 separate, with particulates 16 settling to the bottom of tank 430 and filter media 11 rising through the mixing zone 418 to filter zone 419.

Adjacent open top 435 of tank 430 are a plurality of exit screens 429 which allow the water in tank 430 to overflow therethrough. The water then enters exit troughs 428 and then flows into effluent pipes 422 attached to troughs 428. Having the water exit by overflowing through exit screens 429 prevents build-up of pressure in tank 430 which could otherwise occur if tank 430 instead merely had effluent pipes. Also, the water is exposed to air as it overflows through exit screens 429, causing the water to become oxygenated and to get de-gasified (particularly, excess carbon dioxide is removed from the water).

Further, because the top 435 of tank 430 is open, and the filter media 11 thus rises out of the water, the bacteria riding on the filter media gets oxygen as the beads it is riding on rises out of the water into the air. Also, the open top 435 of tank 430 is advantageous in that it prevents excessive compaction of the filter media 11 because there is nothing restricting the rise of the filter media 11 in tank 430; in filter systems where buoyant filter media can only rise a limited amount, the buoyant filter media tends to compact and suffer from the channeling problems discussed earlier.

Effluent pipes 422 leading from exit troughs 428 can be directed to different fluid tanks (not shown). Individual exit troughs 428 could be replaced by a single trough completely encircling tank 430, with either a single or multiple effluent pipes leading from the single trough. For example, a trough, such as in U.S. Pat. No. 4,743,382, could be used below the screens 429 on the outside of filter tank 430 to catch and direct the water.

Filter media 11 can have, for example, a density of 90% that of water. In such a case, approximately 10% of the media will project upwardly out of the top of the water in tank 430. Thus, the top of tank 430 should project above the bottom of screens 429 at least an amount sufficient to contain any media which will rise above the surface of the water (the bottom of screens 429).

An advantage of tank 430 is that the volumetric capacity of the effluent means is variable and always exceeds the volumetric capacity of the influent means. Water simply rises in tank 430 until the water coming in through the influent means can exit with minimum resistance through the effluent means (including screens 429).

There can be a skimming device (not shown) with a brush to scrape filter media off of screens 429 and to clean the screens 429.

Conveyer means 440 has some advantages over conveyer means 140, primarily in that it has no moving parts, which could break. It may also be more fuel-efficient. However, a filter incorporating conveyer means 440 is less versatile than one using conveyer means 140, as the rate of flow of filter media through duct 442 is dependent upon the rate of flow of water through filter apparatus 410 (at least in the situation shown in FIGS. 7 and 8, where the only influent is through the conveyer means 440).

The main purpose of the filter apparatus of the present invention is to keep the dissolved and suspended solids in the water in a bacteria bed as long as possible for nitrification and to convert them to settleable solids. A settling filter could be used in series with and upstream of the apparatus of the present invention to settle out settleable solids.

Depending upon the rate of flow of filter media through the conveyer means of the filter apparatus of the present invention, different results can be obtained. When there is no flow (static cycle—not possible with filter apparatus 410), all filter media forms part of the filter bed, and the bed therefore becomes thicker and traps more solids and bio-flocculation (bio-floc) builds up on the bed.

When the filter media is cycled relatively slowly through the conveyer means, solids and bio-floc settle out relatively easily.

When the filter media is cycled at a medium speed through the conveyer means, there is some settling of solids and bio-floc and at the same some fluidizing of the bed.

When the filter media is cycled at a relatively high speed through the conveyer means, the filter bed is fluidized and the filter media is constantly rejuvenated.

The filter apparatus of the present invention settles solids, causes the water to undergo a nitrification process, degasifies the water, and oxygenates the water.

While all embodiments of the present invention settle solids and cause the water to undergo a nitrification process, filter apparatus 410 is especially efficient in de-gasifying and oxygenating the water.

To achieve better oxygenation of the water, one can add some auxiliary aeration means to the filter apparatus of the present invention. Adding auxiliary aeration means to tank 30 or tank 130 will help to keep the filter media beds in those tanks from compacting. The auxiliary aeration means could inject either air of oxygen bubbles. The gas would preferably be injected above the bottom of the conveyer means.

The filter apparatus 410 of the present invention provides: continuous cleaning; practically unlimited flow-through (influent, effluent), which maximizes oxygen and degasification; the overflow weir shroud adds oxygen, splash zone, shields; the overflow weir strips effluent of gas (carbon dioxide etc.); maximum use of bio-mass due to cycling of total bed; even distribution of all particulates in rising bed; solids removal/capture/harvest (settleable, suspended, dissolved); minimum vessel pressure which promotes low head; variable speed bed cycling (static, slow, medium fast cycle); bio bed porosity continuously kept open; control of tunneling of bed by cycling continuously; maximizing of bio bed by allowing non-settleable flow to be evenly placed back in bed until bio flow mass increases to settleable proportions; bacteria air contact zone; fluidized bed zone; submerged bed zone; centrifugal pump and weir/influent injector vortex flow combination which allows maximum capacity flow to allow large applications, such as aquaculture and water treatment.

The counter direction friction duct (CDFD) cycles, separates (by friction) bio bead particulates, evenly disperses particulates in bed, aerates, provides movement, directs solids settled, bead casting (deflector zone).

Apparatus 410 allows the bio filter to operate hydraulically as well as mechanically (centrifugally pump), which is an economical energy feature.

Additional features could include: a lighted clear shroud on the outside of screens 429 to produce algae to remove nutrients from effluent water and produce algae for certain species of fish to eat; heated shroud overflow weir configurations to retain heat and heat water with Electricity/Gas/Microwave/Steam Energies; rotating shear angle rake with screen cleaning brush to prepare the upper bio bed wet beads as to shear off into open end of CDFD; insulated walls of the filter to hold heat in cold weather; heat coils in filter insulated walls to hold constant temperature.

Mixer apparatus available from the Denver Mining Co. could be used for large applications.

The filter apparatus of the present invention could be filled with water and used to filter air. In the chemical industry, catalysts could be used.

The foregoing embodiments are presented by way of example only; the scope of the present invention is to be limited only by the following claims.

We claim:

1. A filter apparatus comprising:

(a) tank means for containing a volume of fluid;

(b) influent means for introducing the fluid into the tank means;

(c) effluent means for allowing filtered fluid to exit the tank means;

(d) a filter media, buoyant in water, for filtering predetermined matter out of the fluid;

(e) a filter zone in the tank means, where the filter media is relatively tightly packed;

(f) a mixing zone in the tank means where the filter media is relatively loosely packed;

(g) a quiet zone in the tank means adjacent the mixing zone, the mixing zone being below the filter zone and the quiet zone being below the mixing zone; and (h) conveyer means including a vertical tube, having a top, through which the filter media are conveyed for conveying filter media from the filter zone down to the quiet zone, and a funnel at the top of the vertical tube, wherein;

the conveyer means further includes pipe means for directing influent into the vertical tube, wherein the influent means is connected to the pipe means such that influent entering the vertical tube via the pipe means causes a suction at the funnel, drawing fluid, filter media, and particulates into the vertical tube.

2. The apparatus of claim 1, wherein:

the mixing zone is between the influent means and the filter zone.

3. The apparatus of claim 1, wherein:

the fluid being filtered is water and the filter media comprises beads.

4. The apparatus of claim 1, wherein:

the influent means includes pipes which secure the vertical tube to the wall of the tank means.

5. The apparatus of claim 1, wherein:

the tank means has an open top to allow the buoyant filter media to freely rise out of the water when water is being filtered.

6. The apparatus of claim 1, further comprising:

a waste outlet for extracting predetermined matter from the quiet zone.

7. The apparatus of claim 6, further comprising:

a valve means connected to the waste outlet for allowing periodic extraction of predetermined matter from the quiet zone.

8. The apparatus of claim 1, wherein:

the effluent means comprises:

(i) a plurality of effluent pipes; and (ii) means for stopping fluid flow out of the tank means through at least one effluent pipe while fluid flows out of the tank means through at least one other effluent pipe.

9. The apparatus of claim 1, wherein:

the predetermined matter comprises solid impurities.

10. The apparatus of claim 1, wherein:

the tank means has means to allow the buoyant filter media to freely rise out of the water when water is being filtered.

11. The apparatus of claim 10, wherein:

the effluent means has a volumetric capacity which is variable and always exceeds the volumetric capacity of the influent means.

12. The apparatus of claim 1, wherein:

the effluent means has a volumetric capacity which is variable and always exceeds the volumetric capacity of the influent means.

13. The apparatus of claim 1, wherein the filter media comprises beads having an average diameter of about $3/32$–$1/8$ inch.

* * * * *